(12) United States Patent
Szita (10) Patent No.: US 11,776,570 B2
(45) Date of Patent: Oct. 3, 2023

(54) REDUCING NON-COHERENT REPEATABLE RUNOUT IN TWO-DIMENSIONAL MAGNETIC RECORDING DISK DRIVES

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Gabor Szita, Mountain View, CA (US)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/676,010

(22) Filed: Feb. 18, 2022

(65) Prior Publication Data

US 2023/0267957 A1     Aug. 24, 2023

(51) Int. Cl.
  *G11B 5/596* (2006.01)
(52) U.S. Cl.
  CPC .............................. *G11B 5/59627* (2013.01)
(58) Field of Classification Search
  None
  See application file for complete search history.

(56) References Cited

U.S. PATENT DOCUMENTS

| | | | | |
|---|---|---|---|---|
| 5,815,485 A | * | 9/1998 | Tanaka | G11B 7/00745 |
| 5,978,168 A | * | 11/1999 | Mathews | G11B 5/59627 |
| 6,384,997 B1 | * | 5/2002 | Wu | G06F 3/064 |
| | | | | 360/60 |
| 6,504,664 B1 | * | 1/2003 | Zook | G11B 5/59633 |
| | | | | 360/49 |
| 6,924,960 B1 | * | 8/2005 | Melkote | G11B 5/59655 |
| | | | | 360/77.06 |
| 7,133,239 B1 | * | 11/2006 | Hartman | G11B 5/59688 |
| | | | | 360/75 |
| 8,913,341 B1 | | 12/2014 | Jury et al. | |
| 9,013,824 B1 | * | 4/2015 | Guo | G11B 5/59655 |
| | | | | 360/75 |
| 9,147,416 B2 | | 9/2015 | Grundvig et al. | |
| 2004/0136104 A1 | * | 7/2004 | Chiao | G11B 5/012 |
| | | | | 360/75 |
| 2007/0076314 A1 | * | 4/2007 | Rigney | G11B 5/59688 |
| | | | | 360/75 |
| 2007/0285822 A1 | * | 12/2007 | Lau | G11B 5/59655 |
| 2010/0073808 A1 | * | 3/2010 | Eppler | G11B 5/59688 |
| | | | | 360/77.02 |
| 2013/0027806 A1 | * | 1/2013 | Cho | G11B 5/59655 |
| | | | | 360/75 |
| 2019/0279675 A1 | * | 9/2019 | Schmidt | G11B 5/5965 |
| 2020/0082848 A1 | | 3/2020 | Suzuki et al. | |

* cited by examiner

*Primary Examiner* — Peter Vincent Agustin
(74) *Attorney, Agent, or Firm* — Kim & Stewart LLP (57) ABSTRACT

A method for positioning a magnetic head having first and second read sensors and one write head includes: while the magnetic head is at a first position relative to a disk medium, reading first magnetic servo information written on a first surface of the disk medium, with the first read sensor, and reading second magnetic servo information written on the first surface of the disk medium with the second read sensor; determining a position error of the magnetic head based on the first and second magnetic servo information; and repositioning the magnetic head to a second position relative to the disk medium to compensate for the determined position error of the magnetic head.

13 Claims, 8 Drawing Sheets

REDUCING NON-COHERENT REPEATABLE RUNOUT IN TWO-DIMENSIONAL MAGNETIC RECORDING DISK DRIVES

BACKGROUND

For proper operation of a hard disk drive (HDD), a magnetic head of the HDD must be positioned at a desired radial location with high accuracy. For example, when performing a self-servo write (SSW) process, in which the HDD writes servo sectors on a disk for each data track, the magnetic head is precisely positioned at a specific data track center while the servo information making up the servo sectors is written to the disk. Similarly, when reading data from or writing data to a particular data track of the HDD, the magnetic head is precisely positioned at a specific data track center to avoid read errors or overwriting data in adjacent data tracks.

Deviation of the actual radial position of a magnetic head from an ideal or intended radial position is typically referred to as position error signal (PES), and can be divided into two components: non-repeatable runout (NRRO) and repeatable runout (RRO). NRRO at a particular location on a disk is different with each revolution of the disk and is typically computed by subtracting the repeatable runout (RRO) from a raw measured PES measurement. By contrast, RRO repeats for each disk revolution, and is typically caused by disk distortion, inaccurately positioned servo patterns on the media (such as servo spirals or servo wedges), and media noise. RRO is typically computed using sector-by-sector synchronous averaging of the raw PES, where the raw PES signal is measured over multiple disk revolutions for a particular radial location on the surface of a disk, such as a data track.

RRO can be further divided into two components: coherent RRO and non-coherent RRO. Coherent RRO is the portion of RRO that is identical in a region of adjacent tracks, and is typically caused by disk distortion and coherent inaccuracies in the positioning of the magnetic head when servo patterns are written on the disk. Non-coherent RRO is the portion of RRO that is different in adjacent tracks. Therefore, non-coherent RRO in one track cannot be predicted based on the non-coherent RRO of an adjacent track. Non-coherent RRO is typically caused by inaccurately positioned servo patterns and media noise due to the effect of media magnetic granularity. Typically, media noise contributes to RRO as random white noise. Excessive non-coherent RRO in an HDD can be problematic in multiple situations, including during an SSW process and read operations.

During an SSW process, a magnetic head of the HDD is positioned relative to a disk surface based on timing and position information included in spiral-shaped servo information patterns (or "servo spirals") that are written on a disk surface prior to the SSW process. The final product servo sectors for each data track of the disk are then written one track at a time. Because each disk of a typical HDD is typically configured with hundreds of thousands of tracks, the SSW process is a time-consuming step in the HDD manufacturing process. Further, as the areal density of bits stored on HDD disks continues to increase, the magnitude of non-coherent RRO can be significant relative to the width of increasingly narrow data tracks. A known method for reducing non-coherent RRO for a particular data track, and therefore for more accurately writing the final product servo sectors for the data track, is to take a synchronous average of PES over multiple revolutions of the disk (e.g., four or five) while servoing over that particular data track, and then computing appropriate correction factors for each spiral crossing. However, such an approach greatly increases the time required to complete what is already a time-consuming part of the HDD manufacturing process.

When data are read from a particular data track of an HDD, a magnetic head is precisely positioned as accurately as possible at the data track center to avoid read errors. When read errors do occur, data must be re-read from the data track over one or more additional revolutions of the disk, which can significantly reduce the read performance of the HDD. Because the magnitude of non-coherent RRO can be significant relative to the width of typical data tracks, non-coherent RRO that occurs in an HDD is likely to cause read errors, and therefore adversely affect the performance of the HDD.

In light of the above, there is a need in the art for reducing the non-coherent RRO that occurs in HDDs.

SUMMARY

One or more embodiments provide systems and methods for reducing non-coherent RRO in an HDD configured with a magnetic head that includes a first read sensor and a second read sensor, such as a magnetic head configured to perform two-dimensional magnetic recording (TDMR). According to the embodiments, when the magnetic head of an HDD is at a first position relative to a disk medium, the magnetic head is positioned based on first and second magnetic servo information that is written on a surface of a disk of the HDD, where the first magnetic servo information is read by the first read sensor and the second magnetic servo information is read by the second read sensor. In some embodiments, a first radial position for the magnetic head is determined based on the first magnetic servo information, a second radial position for the magnetic head is determined based on the second magnetic servo information, and an final radial position is determined based on the first radial position and the second radial position. In such embodiments, a PES of the magnetic head is determined based on the final radial position, and the magnetic head is then positioned based on the PES. In such embodiments, the final radial position can be an average of the first radial position and the second radial position, in which case the effect of non-coherent RRO is reduced by a factor of $1/\sqrt{2}$. More generally, in some embodiments, the magnetic head includes N readers, where $N \geq 2$. In such embodiments, the final radial position is based on the N different radial position s associated with the N readers. As a result, the effect of non-coherent RRO can be reduced by a factor of $1/\sqrt{N}$.

According to an embodiment, a method for positioning a magnetic head having first and second read sensors and one write head includes: while the magnetic head is at a first position relative to a disk medium, reading first magnetic servo information written on a first surface of the disk medium, with the first read sensor, and reading second magnetic servo information written on the first surface of the disk medium with the second read sensor; determining a position error of the magnetic head based on the first and second magnetic servo information; and repositioning the magnetic head to a second position relative to the disk medium to compensate for the determined position error of the magnetic head.

A disk drive, according to an embodiment, includes: a magnetic head having first and second read sensors and one write head; a disk medium with a first surface on which magnetic servo information is written; and a controller. The controller is configured to perform the steps of: while the magnetic head is at a first position relative to a disk medium, reading first magnetic servo information written on a first surface of the disk medium, with the first read sensor, and reading second magnetic servo information written on the first surface of the disk medium with the second read sensor; determining a position error of the magnetic head based on the first and second magnetic servo information; and repositioning the magnetic head to a second position relative to the disk medium to compensate for the determined position error of the magnetic head.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

System Overview

Figure 1:
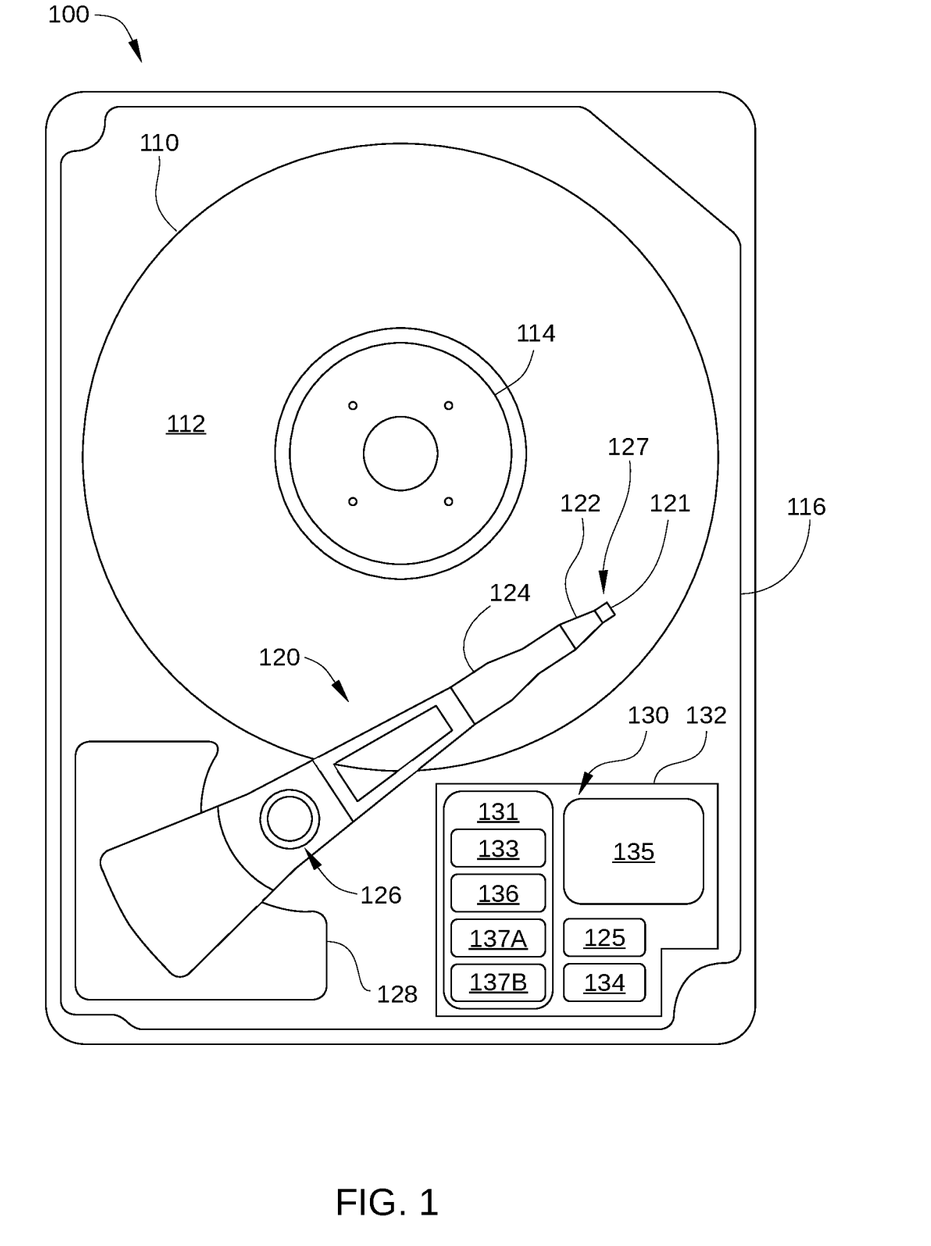
FIG. 1 is a schematic view of an exemplary hard disk drive, according to one embodiment.

FIG. 1 is a schematic view of an exemplary hard disk drive (HDD) 100, according to one embodiment. For clarity, HDD 100 is illustrated without a top cover. HDD 100 includes multiple storage disks 110 (only one of which is visible in FIG. 1) that each include one or two recording surfaces 112 on which a plurality of concentric data storage tracks are disposed. Storage disks 110 are coupled to and rotated by a spindle motor 114 that is mounted on a base plate 116. An actuator arm assembly 120 is also mounted on base plate 116, and includes one or more sliders 121 (only one of which is visible in FIG. 1), each mounted on a flexure arm 122 with a magnetic read/write head 127 that reads data from and writes data to the data storage tracks of an associated recording surface 112. Each flexure arm 122 is attached to an actuator arm 124 that rotates about a bearing assembly 126 by a voice coil motor 128. Thus, voice coil motor 128 moves all of the one or more sliders 121 radially relative to a respective recording surface 112 of a respective storage disk 110, thereby positioning a read/write head 127 over a desired concentric data storage track. Read/write head 127 is a magnetic head that includes multiple read heads, such as a magnetic head configured to perform two-dimensional magnetic recording (TDMR). One embodiment of read/write head 127 is described below in conjunction with FIG. 2.

Figure 2:
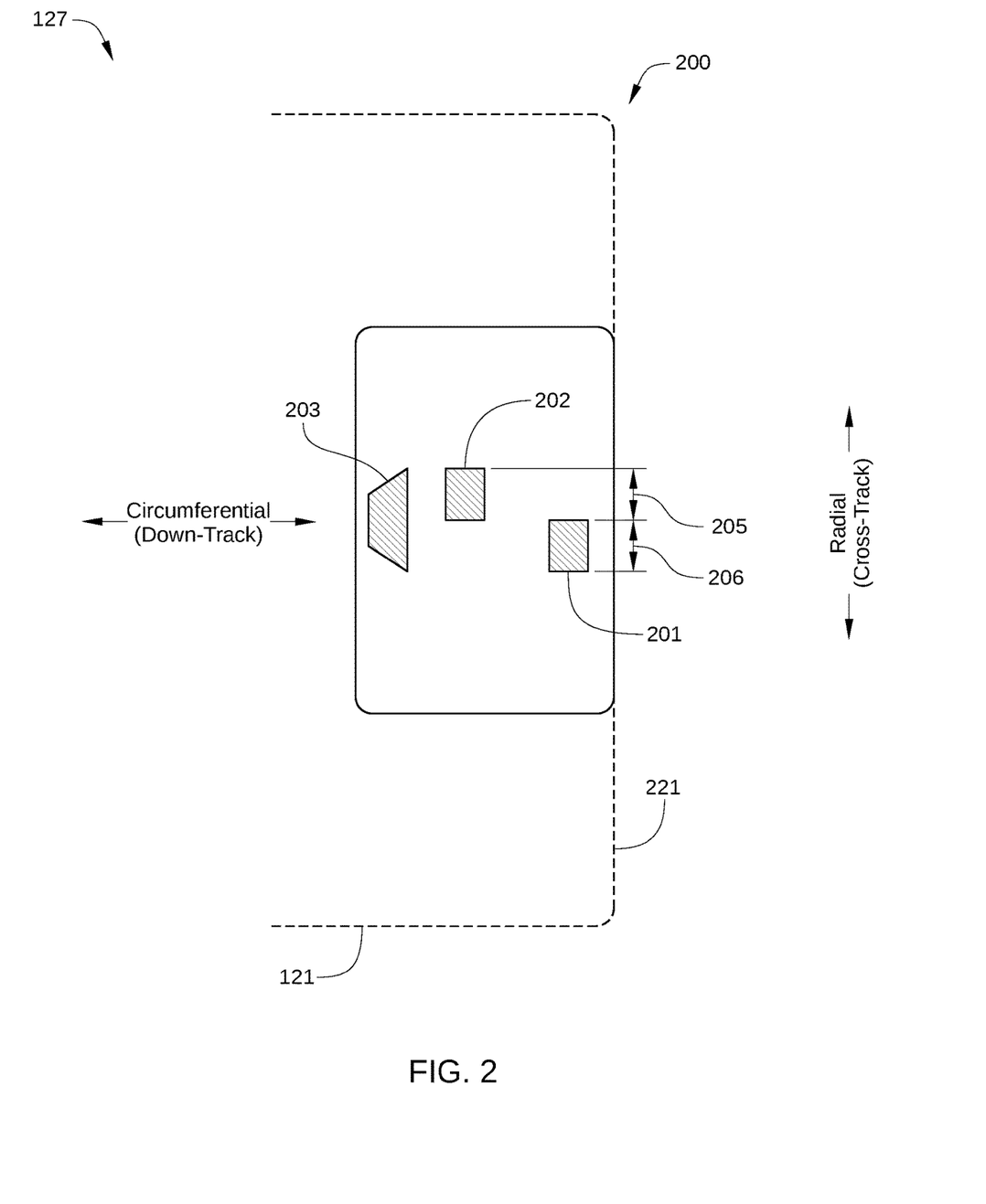
FIG. 2 schematically illustrates an end of a read/write head, according to various embodiments.

FIG. 2 schematically illustrates an end 200 of read/write head 127, according to various embodiments. End 200 faces toward a surface of an associated disk 110 (not shown). In some embodiments, end 200 of read/write head 127 is formed via a series of thin films deposited and lithographically patterned on a trailing surface 221 of slider 121, using fabrication techniques well-known in the art for forming a thin film magnetic head. As shown, in the embodiment illustrated in FIG. 2, read/write head 127 includes a first read sensor 201, a second sensor 202, and a write head 203. For reference, a circumferential (or "down-track") direction and a radial (or "cross-track") direction are also indicated in FIG. 2.

First read sensor 201 and second read sensor 202 are both read sensors that are each configured to generate an output signal when moving past data or servo information written to the surface of a disk 110 (not shown) that is associated with read/write head 127. In some embodiments, first read sensor 201 and second read sensor 202 are each disposed between two magnetic shields (not shown) that are formed of magnetically permeable material. In some embodiments, the magnetic shields for first read sensor 201 and second read sensor 202 are electrically conductive and function as electrical leads to first read sensor 201 and second read sensor 202. The magnetic shields are configured to prevent or reduce the likelihood of first read sensor 201 and second read sensor 202 erroneously reading recorded data proximate the current data track being read.

In the embodiment illustrated in FIG. 2, first read sensor 201 and second read sensor 202 are offset from each other by an offset 205 in the radial direction when read/write head 127 is oriented with a skew angle of zero degrees relative to the disk 110. Alternatively, in other embodiments, first read sensor 201 and second read sensor 202 can be aligned with each other in the radial direction when read/write head is oriented with a skew angle of zero degrees relative to the disk 110. In some embodiments, a width 206 of first read sensor 201 and/or second read sensor 202 is based on the track pitch of the disk 110 (i.e., the distance from a data track center of one track to the data track center of an adjacent track). Alternatively or additionally, in some embodiments, first read sensor 201 and second read sensor 202 can each have a different width in the radial and/or circumferential directions.

In the embodiment illustrated in FIG. 2, read/write head 127 has two read heads. In other embodiments, read/write head 127 can have any technically feasible number N of read heads. In such embodiments, the N read heads of read/write head 127 may be aligned with each other in the radial direction or the circumferential direction and/or offset from each other in the radial direction or the circumferential direction. Further, in such embodiments, each of the N read heads may be similar in size and/or composition, or may have different sizes and/or compositions.

Write head 203 is configured to write information to a surface of the disk 110 that corresponds to read/write head 127. In some embodiments, write head 203 includes a perpendicular magnetic write pole (WP). Further, in some embodiments, write head 203 includes trailing and/or side shields (not shown).

Returning to FIG. 1, spindle motor 114, read/write head 127, and voice coil motor 128 are coupled to electronic circuits 130, which are mounted on a printed circuit board 132. In some embodiments, each read/write head 127 has an associated additional actuator. The additional actuator (not shown in FIG. 1) could be on the suspension (i.e., flexure arm 122), at the gimbal between the suspension and slider 121, or on slider 121, and can move the associated read/write head 127 radially a small distance. Such actuators are generally referred to as dual-stage actuators, and enable the servo system of HDD 100 to attain more accurate tracking control.

In the embodiment illustrated in FIG. 1, a single actuator arm assembly 120 is shown that includes only one slider 121, one flexure arm 122, one actuator arm 124, and one read/write head 127. In other embodiments, actuator arm assembly 120 includes a plurality of actuator arms 124, sliders 121, flexure arms 122, and read/write heads 127, where each read/write head 127 is associated with a different recording surface 112 of HDD 100. Further, in some embodiments, HDD 100 can include multiple actuator arm assemblies 120 that are each rotated about bearing assembly 126 by a respective VCM 128 independently from each other. In such embodiments, each actuator arm assembly 120 may each include a plurality of actuator arms 123, sliders 121, flexure arms 122, and read/write heads 127.

Electronic circuits 130 include read/write channel 137A a read channel 137B, a microprocessor-based controller 133, random-access memory (RAM) 134 (which may be a dynamic RAM and used as one or more data buffers) and/or a flash memory device 135, and, in some embodiments, a flash manager device 136. In some embodiments, read/write channel 137A, read channel 137B, microprocessor-based controller 133, and/or flash manager device 136 are included in a single chip, such as a system-on-chip 131. In some embodiments, HDD 100 further includes a motor-driver chip 125 that accepts commands from microprocessor-based controller 133 and drives both spindle motor 114 and voice coil motor 128. Read/write channel 137A communicates with first read sensor 201 (shown in FIG. 2) of read/write head 127 via a preamplifier (not shown) that may be mounted on a flex-cable that is itself mounted on either base plate 116, actuator arm 120, or both. Similarly, read channel 137B communicates with second read sensor 202 (shown in FIG. 2) of read/write head 127 via a preamplifier (not shown) that may be mounted on the flex-cable.

When data are transferred to or from a particular storage disk 110 of HDD 100, actuator arm assembly 120 moves in an arc between the inner diameter (ID) and the outer diameter (OD) of a particular storage disk 110. Actuator arm assembly 120 accelerates in one angular direction when current is passed in one direction through the voice coil of voice coil motor 128 and accelerates in an opposite direction when such current is reversed, thereby allowing control of the position of actuator arm assembly 120 and the attached read/write head 127 with respect to the particular storage disk 110. Voice coil motor 128 is coupled with a servo system that uses the positioning data read from servo wedges on storage disk 110 by read/write head 127 to determine the position of read/write head 127 over a specific data storage track. For example, the servo system may position read/write head 127 over recording surface 112 based on positioning data read from recording surface 112.

In positioning a read/write head 127 over a recording surface 112, the servo system determines an appropriate current to drive through the voice coil of voice coil motor 128, and drives said current using a current driver and associated circuitry. Typically, the appropriate current is determined based in part on a position feedback signal of the read/write head 127, such as a position error signal (PES). The PES is typically generated by using servo patterns included in the servo wedges (not shown) on the recording surface 112 as a reference. One embodiment of a recording surface 112 is illustrated in FIG. 3.

Figure 3:
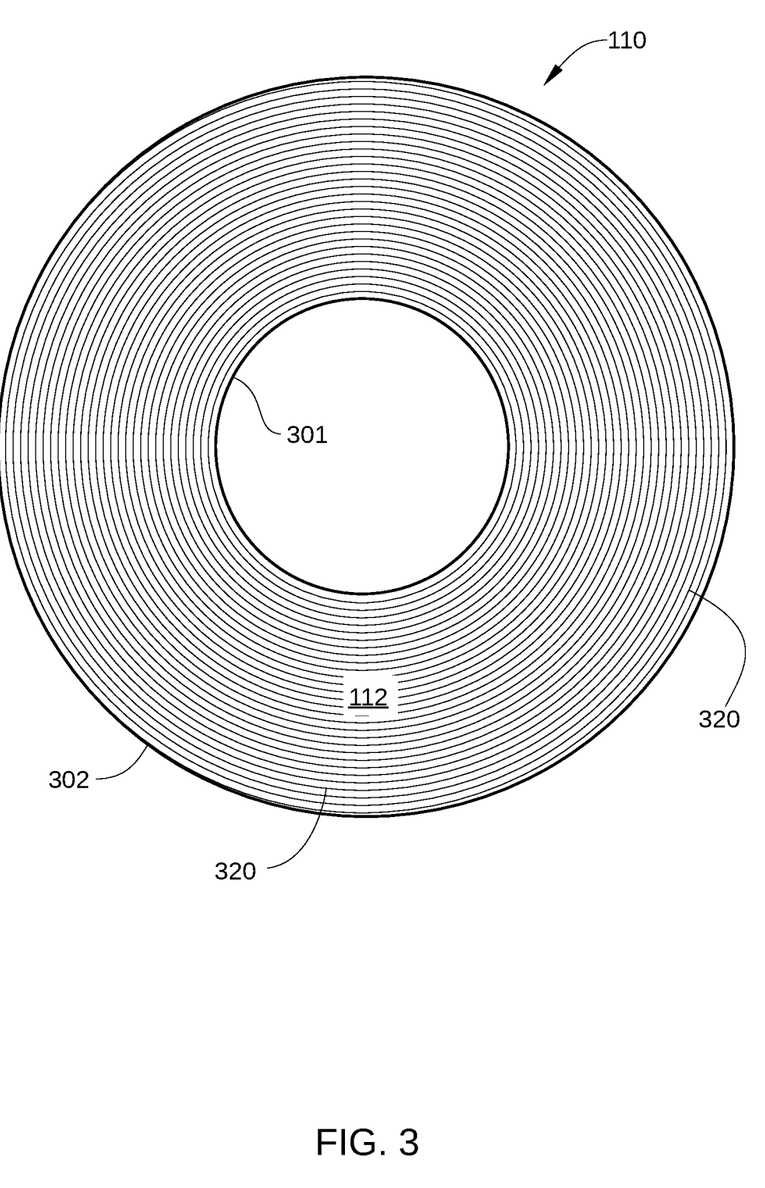
FIG. 3 schematically illustrates a recording surface of a storage disk with concentric data storage tracks formed thereon, according to an embodiment.

FIG. 3 schematically illustrates a recording surface 112 of a storage disk 110 with concentric data storage tracks 320 formed thereon, according to an embodiment. Data storage tracks 320 are formed on recording surface 112 between an ID 301 and an OD 302 of storage disk 110. Data storage tracks 320 are configured for storing data, and the radial position and track pitch, i.e., spacing, of data storage tracks 320 is defined by servo sectors (not shown) formed on recording surface 112. Each servo sector contains a reference signal that is read by read/write head 127 during read and write operations to position read/write head 127 above a desired data storage track 320. Typically, the actual number of data storage tracks 320 included on recording surface 112 is considerably larger than illustrated in FIG. 3. For example, recording surface 112 may include hundreds of thousands of concentric data storage tracks 320.

In order for HDD 100 to perform SSW and write the above-described servo wedges on storage disk 110 with the necessary precision for proper operation of HDD 100, position and timing information are provided to the disk drive servo system of HDD 100. The position and timing information that enable the internal servo system of HDD 100 to perform servo self-write (SSW) is typically in the form of reference spiral tracks or "servo spirals" written on storage disk 110. One embodiment of such servo spirals is illustrated in FIG. 4.

Figure 4:
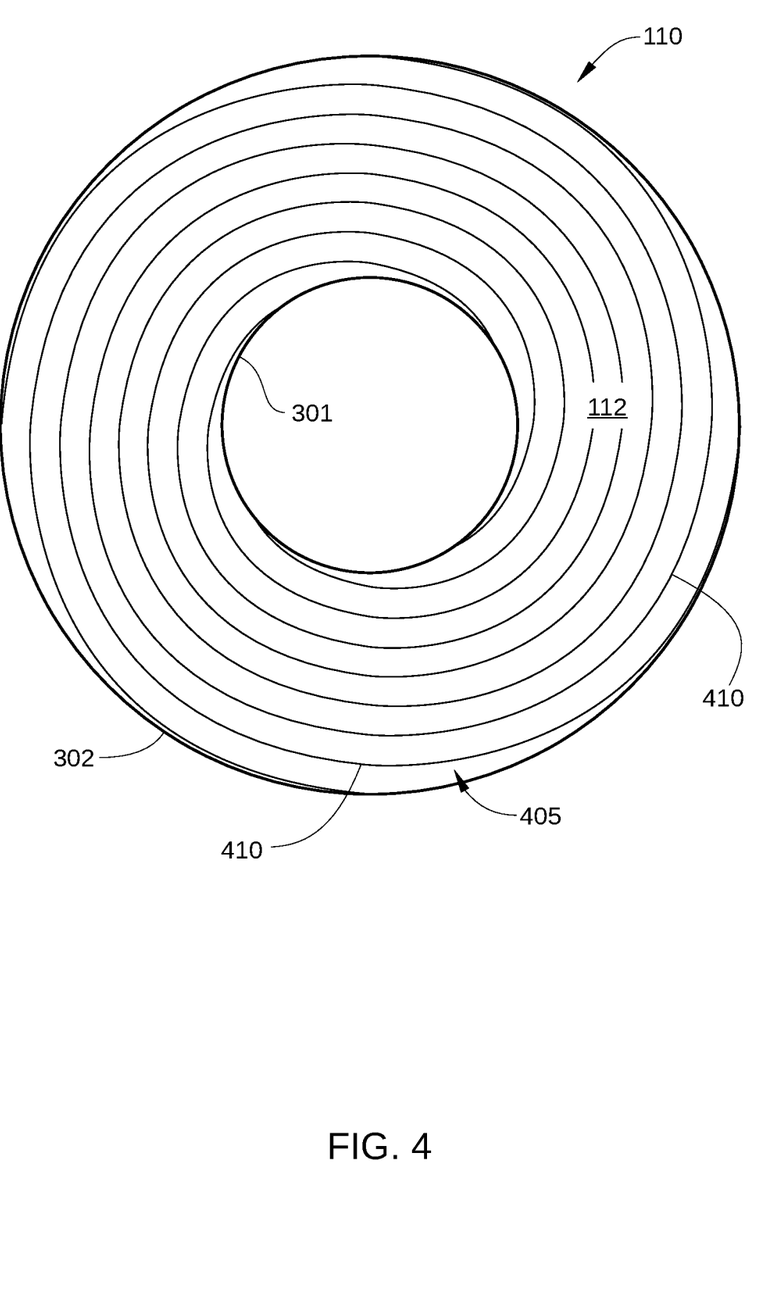
FIG. 4 illustrates a storage disk prior to undergoing an SSW process, according to one embodiment.

FIG. 4 illustrates storage disk 110 prior to undergoing an SSW process, according to one embodiment. As shown, storage disk 110 has a spiral set 405 written thereon that includes a plurality of reference spirals 410 that are each circumferentially spaced from adjacent reference spirals 410. It is noted that the number of reference spirals 410 in spiral set 405 is generally larger than that shown in FIG. 4, for example as few as ten or twenty, or as many as several hundred.

Spiral set 405 may be any set of reference spirals configured to provide timing and position information for the servo system of HDD 100 to position a write head while writing servo sectors for data storage tracks 320 (shown in FIG. 3) or another set of reference spirals. Thus, in some embodiments, spiral set 405 is a set of coarse, i.e., initial, reference spirals. In such embodiments, spiral set 405 may be written onto a substantially blank surface 112 of storage disk 110 without the aid of external equipment using read/write head 127 and the servo system of HDD 100, for example, via a bootstrap spiral-writing process. In such a process, references spirals 410 of spiral set 405 are written by read/write head 127 while actuator arm assembly 120 is moved across surface 112 either by applying a suitable open loop voltage or current profile, or by using velocity control based on back EMF feedback. Alternatively, in some embodiments spiral set 405 is a set of fine reference spirals, i.e., reference spirals that are more accurately positioned than coarse reference spirals. In such embodiments, spiral set 405 is written onto surface 112 after surface 112 has another set of the above-described coarse spirals written thereon (not shown for clarity). In such embodiments, reference spirals 410 are typically written onto surface 112 using closed-loop tracking of the previously written coarse reference spirals, and can be used subsequently for writing a more accurately positioned set of servo spirals, such as final reference spirals, that enable the writing of servo sector information on surface 112 by HDD 100 in an SSW process. Thus, reference spirals 410 enable the generation of a set of more accurately positioned reference spirals or the writing of final servo sector information on surface 112 using closed-loop control in the servo system of HDD 100.

Figure 5:
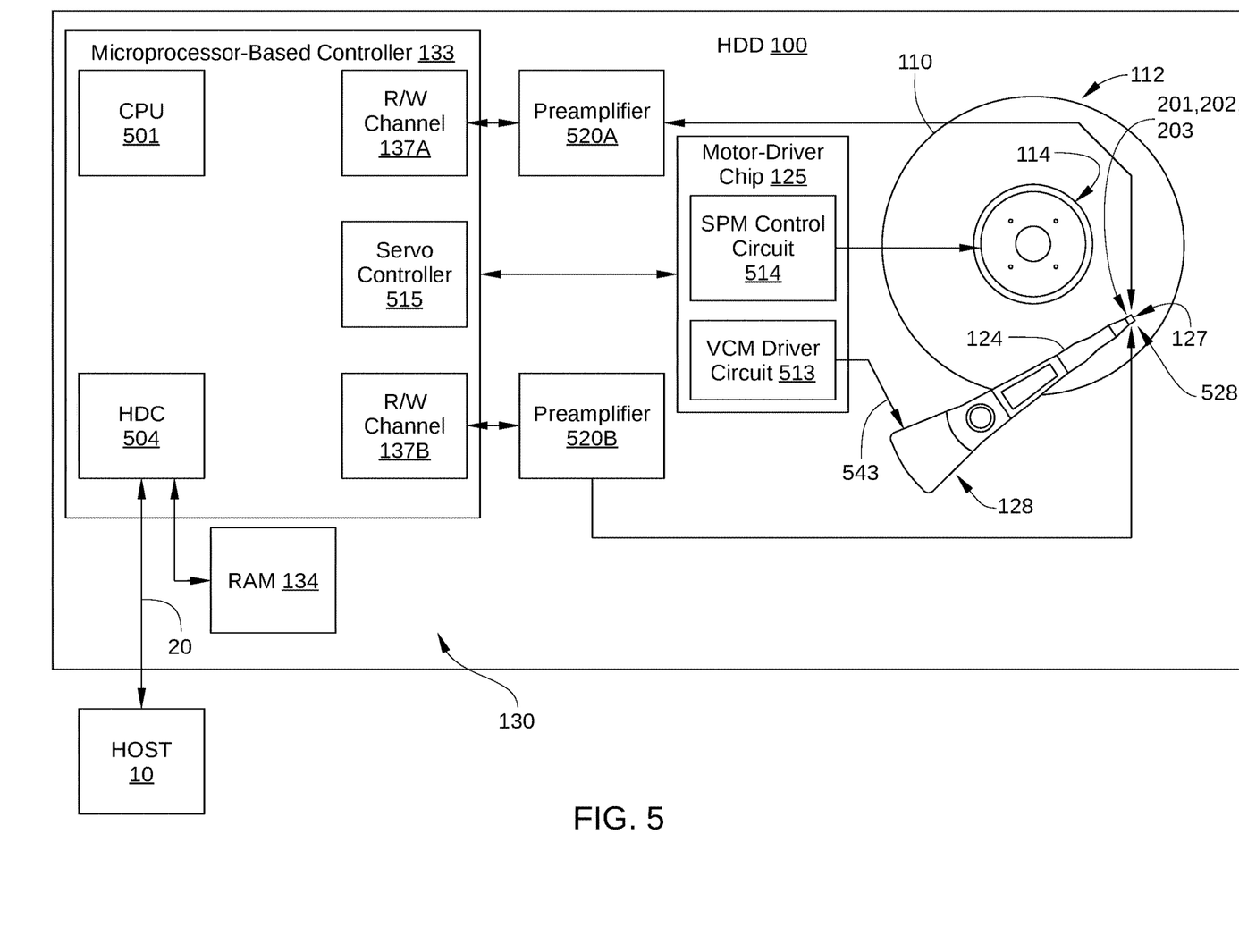
FIG. 5 illustrates an operational diagram of an exemplary hard disk drive configured to implement various embodiments.

FIG. 5 illustrates an operational diagram of HDD 100 configured to implement various embodiments. In the embodiment illustrated in FIG. 5, a specific configuration of certain elements of electronic circuits 130 is described. In other embodiments, any other suitable arrangement or configuration of electronic circuits 130 may be employed that is operable to implement one or more embodiments described herein. For example, in some embodiments, various elements of microprocessor-based controller 133 may be configured in a single SoC and/or implemented as stand-alone chips included in electronic circuits 130.

HDD 100 is connected to a host 10, such as a host computer, via a host interface 20, such as a serial advanced technology attachment (SATA) bus or a Serial Attached Small Computer System Interface (SAS) bus. As shown, electronic circuits 130 of HDD 100 include microprocessor-based controller 133 and motor driver chip 125 communicatively coupled to microprocessor-based controller 133.

In the embodiment illustrated in FIG. 5, microprocessor-based controller 133 includes one or more central processing units (CPUs) 501 or other processors, a servo controller 515, a hard disk controller (HDC) 504, a read/write channel 137A, and a read channel 137B.

Motor-driver chip 125 includes a VCM driver circuit 513 and a spindle motor (SPM) control circuit 514. VCM driver circuit 513 generates an amplified control signal 543 in response to control signals (such as VCM commands) from servo controller 515. Control signals 543 enable execution of disk access commands received from host 10 that are to be executed by a servo system of HDD 100 that includes VCM 128.

In the embodiment illustrated in FIG. 5, HDD 100 includes a single RAM 134 that is external to microprocessor-based controller 133. In other embodiments, HDD 100 may include any other suitable configuration of RAM 134, such as a DRAM device integrated in microprocessor-based controller 133.

HDD 100 further includes a preamplifier 520A associated with read sensor 201 and/write head 203 and a preamplifier 520B associated with read sensor 202. Preamplifiers 520A and 520B can be each mounted on actuator arm assembly 120 or elsewhere within the head and disk assembly (HDA) of HDD 100. Preamplifier 520A amplifies a read signal output from read sensor 201 and transmits the amplified read signal to read/write channel 137A. In addition, preamplifier 520A supplies a write signal (e.g., current) to write head 203 in response to write data input from read/write channel 137A. Preamplifier 520B amplifies a read signal output from read sensor 202 and transmits the amplified read signal to read channel 137B.

CPU 501 controls HDD 100, for example according to firmware stored in flash memory device 135 or another nonvolatile memory, such as portions of recording surfaces 112. For example, CPU 501 manages various processes performed by HDC 504, read/write channel 137A, read channel 137B, read sensor 201, read sensor 202, write head 203, recording surfaces 112, and/or motor-driver chip 125. Such processes include a writing process for writing data onto recording surfaces 112, a reading process for reading data from recording surfaces 112, various calibration processes, a self-servo-writing process, and the like.

In some embodiments, a servo system of HDD 100 (e.g., CPU 501, read/write channel 137A, write channel 137B, preamplifier 520A, preamplifier 520B, servo controller 515, voice-coil motor 128, and a suitable microactuator 528) performs positioning of read/write head 127 included in actuator arm assembly 120 over a corresponding recording surface 112, during which CPU 501 determines an appropriate current to drive through the voice coil of VCM 128. Typically, the appropriate current is determined based in part on a position feedback signal of read/write head 127, such as PES.

Read/write channel 137A and read channel 137B are signal processing circuits that decode read signals transmitted from respective preamplifiers 520A and 520B into read data that are outputted to HDC 504. In addition, read/write channel 137A encodes write data input from HDC 504 and outputs the encoded write data to preamplifier 520A. In some embodiments, HDC 504 controls access to RAM 134 by CPU 501, read/write channel 137A, and write channel 137B, and receives/transmits data from/to host 10. In some embodiments, HDC 504 receives/transmits data from/to host 10 via interface 20.

In the embodiment illustrated in FIG. 5, various links are shown between certain elements of HDD 100 for enablement of certain embodiments. In some embodiments, additional and/or alternative links between certain elements of HDD 100 may exist for operation of HDD 100, but are not shown for clarity and ease of description. Such additional and/or alternative links would be known to one of ordinary skill in the art.

Non-Coherent Repeatable Runout Reduction

According to various embodiments, RRO is reduced in an HDD by positioning a magnetic head of the HDD using multiple read heads included in the magnetic head. In the embodiments, a final radial position of the magnetic head is determined based on multiple radial position values determined for the magnetic head, where each of the multiple radial position values is associated with a different read head included in the magnetic head. One such embodiment is described below in conjunction with FIGS. 6-8.

Figure 6:
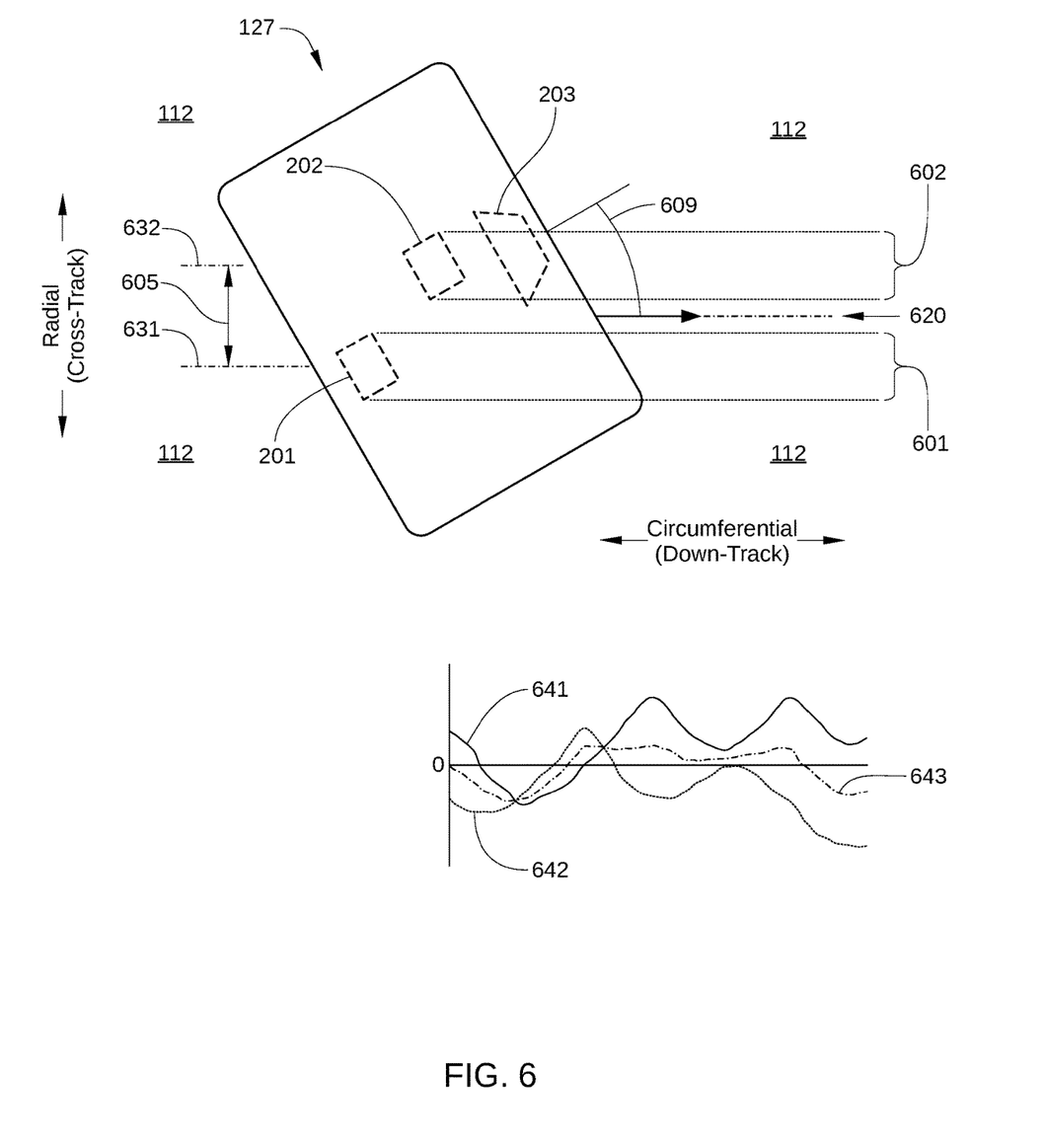
FIG. 6 schematically illustrates a read/write head moving circumferentially relative to a recording surface of a magnetic disk, according to various embodiments.

FIG. 6 schematically illustrates read/write head 127 moving circumferentially (down-track) relative to a recording surface 112 of a magnetic disk, according to various embodiments. In the embodiments, a final radial position 620 of read/write head 127 is determined by demodulating a first radial position 631 for read sensor 201 and a second radial position 632 for read sensor 202. As shown, first radial position 631 for read sensor 201 differs from second radial position 632 for read sensor 202 due to a radial offset 605 between read sensor 201 and read sensor 202. Therefore, read sensor 201 and read sensor 202 each follow a different radial path relative to recording surface 112. In the instance illustrated in FIG. 6, read sensor 201 follows a circumferential path 601 that is associated with first radial position 631 and read sensor 202 follows a circumferential path 602 that is associated with second radial position 632.

Generally, the relative locations of read sensor 201 and read sensor 202 within read/write head 127 produce a first portion of radial offset 605. Thus, radial offset 605 can vary depending in part on where read sensor 201 and read sensor 202 are located within read/write head 127. In addition, the orientation of read/write head 127 relative to recording surface 112 contributes a second portion to radial offset 605. That is, the orientation of read/write head 127 at a skew angle 609 also affects the magnitude of radial offset 605 for any particular radial location of recording surface 112. It is noted that skew angle 609 varies across the stroke of actuator arm assembly 120 (shown in FIG. 1) that radially positions read/write head 127 relative to recording surface 112. Thus, in some instances, skew angle 609 produces a significant portion of radial offset 605 to occur, and, in other instances, skew angle 609 can produce little or none of radial offset 605 to occur.

Also shown in FIG. 6 are a non-coherent RRO profile 641 associated with circumferential path 601, a non-coherent RRO profile 642 associated with circumferential path 602, and a composite non-coherent RRO profile 643. Non-coherent RRO profile 641 schematically illustrates a media noise contribution to signals read by read sensor 201 while following circumferential path 601, and non-coherent RRO profile 642 schematically illustrates a media noise contribution to signals read by read sensor 202 while following circumferential path 602. Media noise includes random noise that is added to signals read from recording surface 112 by read sensor 201 and read sensor 202, and can be generated by non-uniformities in the size and shape of magnetic grains forming recording surface 112. As shown, the media noise schematically illustrated by non-coherent RRO profile 641 and non-coherent RRO profile 642 can vary randomly across recording surface 112 along a particular circumferential path (i.e., as a read sensor moves circumferentially relative to recording surface 112). As a result, media noise is different for each radial location on recording surface 112. That is, for each radial location on recording surface 112 (e.g., circumferential path 601) there is an associated media granularity "signature" that differs randomly from an associated media granularity signature for an adjacent radial location on recording surface 112 (e.g., circumferential path 602). These media granularity signatures are depicted schematically in FIG. 6 by non-coherent RRO profile 641 and non-coherent RRO profile 642.

Composite non-coherent RRO profile 643 schematically illustrates a resultant media granularity signature that is generated by combining non-coherent RRO profile 641 and non-coherent RRO profile 642. For example, in some embodiments, non-coherent RRO profile 643 schematically illustrates an average of non-coherent RRO profile 641 and non-coherent RRO profile 642. As shown, at any particular circumferential location, an absolute value of the magnitude of non-coherent RRO profile 643 is equal to or less than either an absolute value of the magnitude of either non-coherent RRO profile 641 or non-coherent RRO profile 642. Further, the absolute value of the magnitude of non-coherent RRO profile 643 is, on average, less than either an absolute value of the magnitude of either non-coherent RRO profile 641 or non-coherent RRO profile 642 by a factor of $1/\sqrt{2}$. Thus, non-coherent RRO profile 643 schematically depicts the reduction in non-coherent RRO that is included in a position determination when final radial position 620 of read/write head 127 is determined based on multiple radial position values (e.g., first radial position 631 and second radial position 632).

Figure 7:
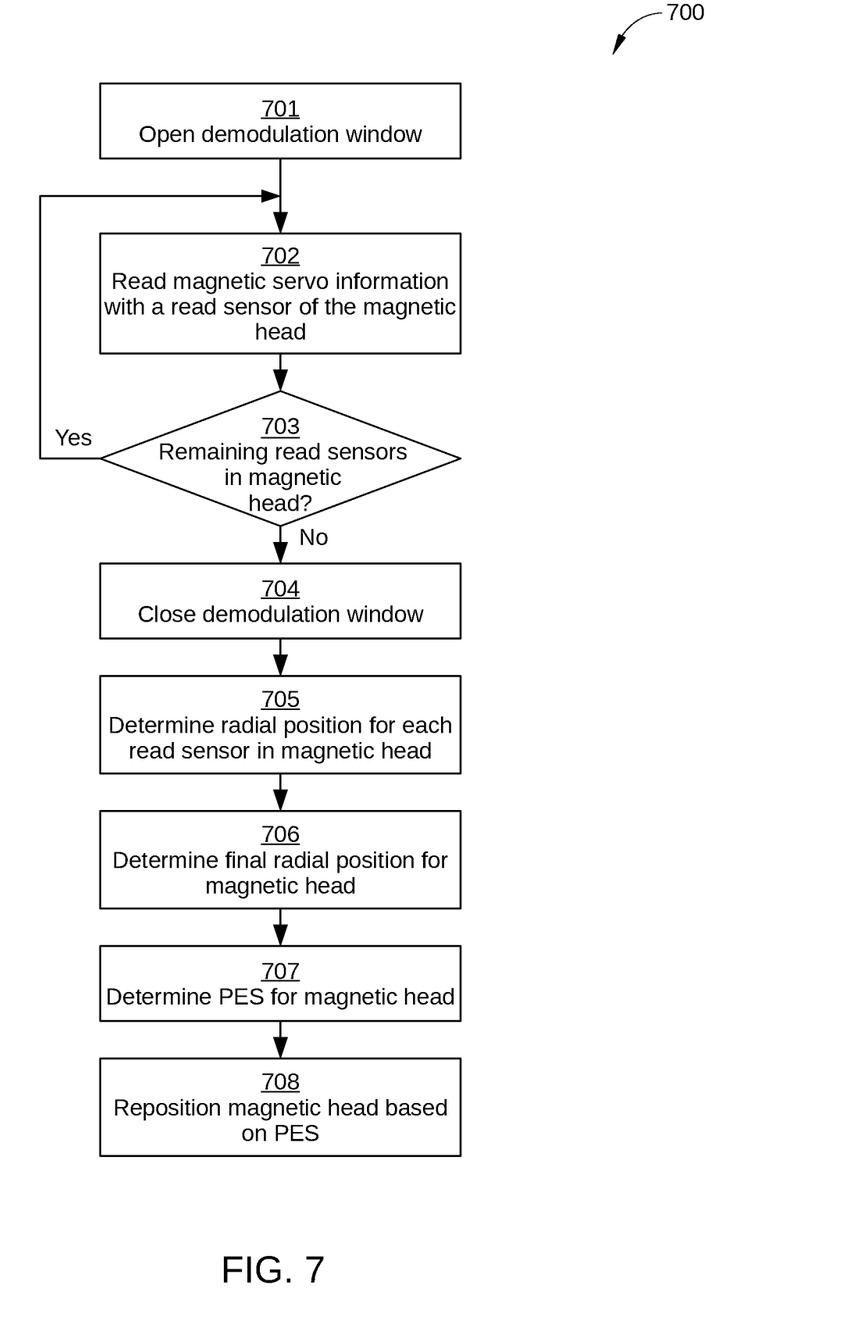
FIG. 7 sets forth a flowchart of method steps for positioning a magnetic head of an HDD, according to various embodiments.

FIG. 7 sets forth a flowchart of method steps for positioning a magnetic head of an HDD, according to various embodiments. The method steps may include one or more operations, functions, or actions as illustrated by one or more of blocks 701-708. Although the blocks are illustrated in a sequential order, these blocks may be performed in parallel, and/or in a different order than those described herein. Also, the various blocks may be combined into fewer blocks, divided into additional blocks, and/or eliminated based upon a specific implementation. Although the method steps are described in conjunction with HDD 100 of FIGS. 1-6, persons skilled in the art will understand that the method steps may be performed with other types of systems. The control algorithms for the method steps may reside in microprocessor-based controller 133, some other controller associated with HDD 100, or a combination thereof. The control algorithms can be implemented in whole or in part as software- or firmware-implemented logic, and/or as hardware-implemented logic circuits.

In some embodiments, the method steps are performed as part of an SSW process. In such embodiments, prior to the method steps, spiral set 405 is written or otherwise formed on storage disk 110 of HDD 100, for example as fine guide spirals. In addition, read/write head 127 is radially positioned to write magnetic servo information, such as servo wedges for a particular data storage track 320 or a servo spiral for a new set of guide spirals. Thus, prior to the method steps, voice coil motor 128 seeks read/write head 127 to a first radial position relative to storage disk 110. Alternatively, in some embodiments, the method steps are performed as part of a read or write operation. In such embodiments, prior to the method steps, servo wedges are written on storage disk 110 for data storage tracks 320. In addition, read/write head 127 is radially positioned to read data stored in a particular data storage track 320 of disk 110 or write data to a particular storage data track 320. Thus, prior to the method steps, voice coil motor 128 seeks read/write head 127 to a first radial position relative to storage disk 110.

A method 700 begins at step 701, when a suitable controller (e.g., microprocessor-based controller 133) opens a modulation window for demodulating magnetic servo information that includes position information for positioning read/write head 127. In some embodiments, a disk-locked timing signal is used to open the demodulation window. Generally, the demodulation window is timed to open prior to read/write head 127 passing over the magnetic servo information, as illustrated in FIG. 8.

Figure 8:
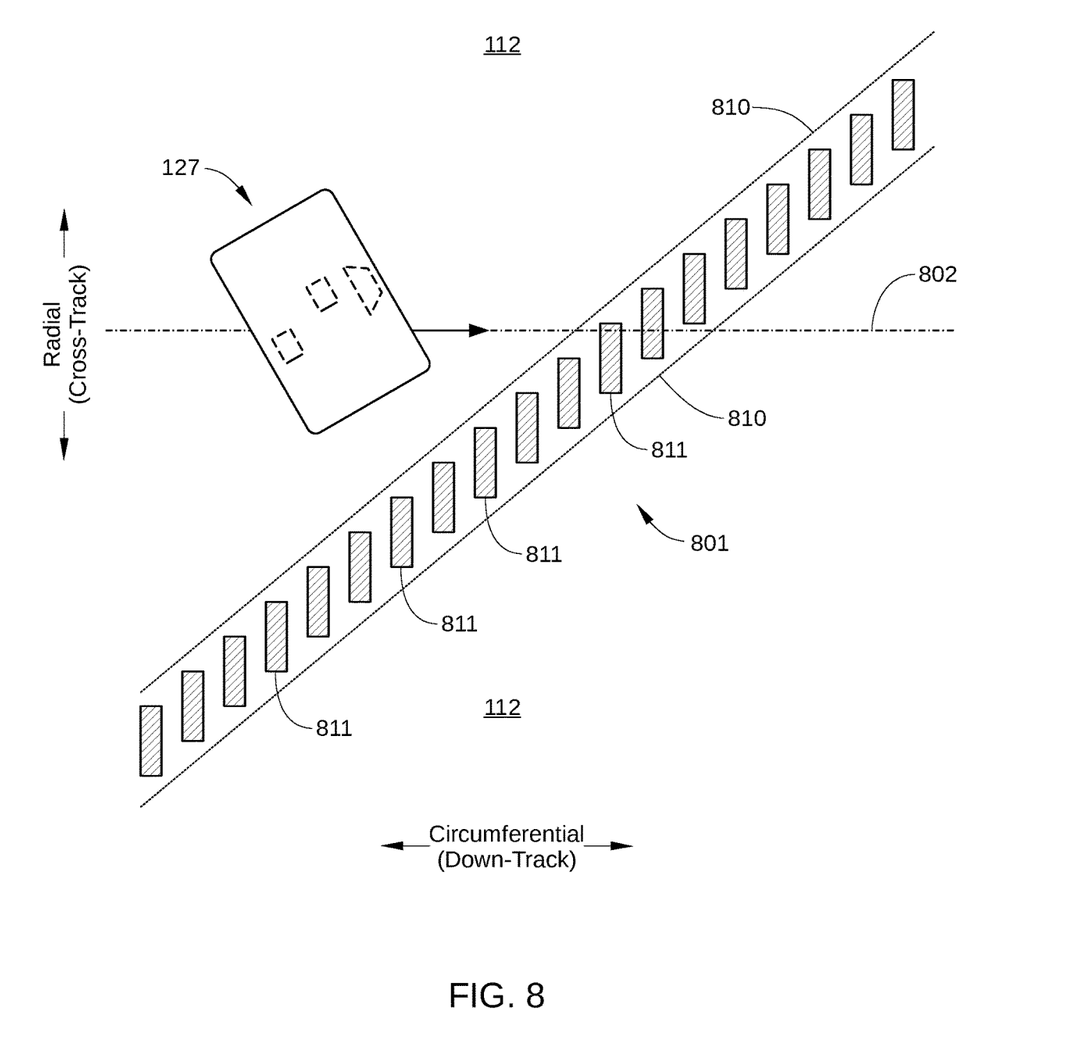
FIG. 8 is a schematic diagram of a read/write head and a recording surface when a demodulation window is opened, according to various embodiments.

FIG. 8 is a schematic diagram of read/write head 127 and recording surface 112 when a demodulation window is opened, according to various embodiments. As shown, when the demodulation window is opened, read/write head 127 is moving circumferentially relative to recording surface 112 at a radial position 802 and proximate to magnetic servo information 801 (cross-hatched). In some instances, magnetic servo information 801 is configured as a servo spiral 810, such as a reference spirals 410 of FIG. 4. Such an instance is depicted in FIG. 8. In other instances, magnetic servo information 801 is configured as a portion of a servo wedge associated with a data storage track 320 positioned at radial position 802. In the instance illustrated in FIG. 8, servo spiral 810 includes a plurality of magnetic transitions 811 written on recording surface 112.

Returning to FIG. 7, in step 702, while read/write head 127 passes over magnetic servo information 801 shown in FIG. 8, the controller reads magnetic servo information 801 with a read sensor of read/write head 127. In step 703, the controller determines whether there are any remaining read sensors in read/write head 127 to read magnetic servo information 801. If yes, method 700 returns to step 702; if no, method 700 proceeds to step 704. In some embodiments, multiple read sensors of read/write head 127 can read magnetic servo information 801 simultaneously in step 702, since each read sensor generally has an associated read channel and multiple read sensors may be positioned over a portion of magnetic servo information 801 simultaneously.

It is noted that a signal generated by the read sensor in step 702 is primarily generated from the magnetic transitions 811 of magnetic servo information 801. In addition, the signal generated by the read sensor in step 702 includes a contribution from any non-coherent RRO associated with the circumferential path on recording surface 112 positioned at radial position 802. That is, the media granularity signature of the current circumferential path on recording surface 112 (such as non-coherent RRO profile 641 or non-coherent RRO profile 642) is included in the signals generated from magnetic transitions 811. Thus, the signal generated by the read sensor in step 702 includes a portion associated with the magnetic transitions 811 of magnetic servo information 801 and a portion associated with the media granularity signature of the circumferential path associated with the read sensor.

In step 704, the controller closes the demodulation window. In some embodiments, the controller closes the demodulation window in step 704 based on a disk-locked timing signal. In such embodiments, the disk-locked timing signal is selected to occur after read/write head 127 has crossed magnetic servo information 801. Alternatively, in some embodiments, the controller closes the demodulation window in step 704 based on the determination that there are no read sensors of read/write head remaining to read magnetic servo information 801.

In step 705, the controller determines a radial position for each read sensor included in read/write head 127. The radial position for a particular read sensor is determined based on the magnetic servo information read by that particular sensor. Thus, in step 705, the radial position determined in step 705 for each read sensor is different from the radial positions determined for the other read sensors of read/write head 127.

In step 706, the controller determines a final radial position of read/write head 127 based on the radial positions determined in step 705. For example, in some embodiments, the final radial position is an average of the radial positions determined in step 705. In such embodiments, the contribution of non-coherent RRO to the final radial position is, on average, reduced by a factor of $1/\sqrt{N}$, where N is the number of read sensor radial positions determined in step 705. In some embodiments, the average of the radial positions determined in step 705 can be a simple average. In other embodiments, the average of the radial positions determined in step 705 can be a weighted average. For example, in such embodiments, a different weighting can be assigned to each radial position based on a geometric factor associated with the read sensors, such as a radial distance of each read sensor from a center point of read/write head 127.

In step 707, the controller determines PES for read/write head 127 based on the final radial position determined in step 706. In step 708, the controller repositions read/write head 127 based on the PES determined in step 707, for example via conventional servo techniques known in the art. For example, in step 708, voice coil motor 128 seeks read/write head 127 to a second radial position relative to storage disk 110.

While the foregoing is directed to embodiments of the present invention, other and further embodiments of the invention may be devised without departing from the basic scope thereof, and the scope thereof is determined by the claims that follow.

I claim:

1. A method of positioning a magnetic head of a disk drive having first and second read sensors and one write head, said method comprising:
    while the magnetic head is at a first position relative to a disk medium, reading first magnetic servo information written on a first surface of the disk medium, with the first read sensor, and reading second magnetic servo information written on the first surface of the disk medium with the second read sensor;
    determining a position error of the magnetic head based on the first and second magnetic servo information; and
    repositioning the magnetic head to a second position relative to the disk medium to compensate for the determined position error of the magnetic head;
    wherein the first and second magnetic servo information are included in a single servo spiral.

2. The method of claim 1, wherein the first and second magnetic servo information are read by the first and second read sensors during writing of another servo spiral by the write head.

3. The method of claim 1, wherein the first and second magnetic servo information are read by the first and second read sensors during writing of a servo wedge for a track of the disk medium by the write head.

4. The method of claim 1, wherein determining the position error of the magnetic head comprises:
    determining a first radial position based on the first magnetic servo information;
    determining a second radial position based on the second magnetic servo information; and
    determining a final radial position based on the first radial position and the second radial position.

5. The method of claim 4, wherein determining the position error of the magnetic head further comprises determining the position error of the magnetic head based on the final radial position.

6. The method of claim 4, wherein determining the final radial position based on the first radial position and the second radial position comprises determining the final radial position based on an average of the first radial position and the second radial position.

7. The method of claim 1, wherein reading the first magnetic servo information comprises generating a first signal that includes a first portion associated with magnetic transitions included in the first magnetic servo information and a second portion associated with a media granularity signature of a circumferential path of the first read sensor.

8. The method of claim 7, wherein reading the second magnetic servo information comprises generating a second signal that includes a third portion associated with magnetic transitions included in the second magnetic servo information and a fourth portion associated with a media granularity signature of a circumferential path of the second read sensor.

9. A disk drive, comprising:
    a magnetic head having first and second read sensors and one write head;
    a disk medium with a first surface on which magnetic servo information is written; and
    a controller configured to perform the steps of:
        while the magnetic head is at a first position relative to a disk medium, reading first magnetic servo information written on a first surface of the disk medium, with the first read sensor, and reading second magnetic servo information written on the first surface of the disk medium with the second read sensor;

determining a position error of the magnetic head based on the first and second magnetic servo information; and repositioning the magnetic head to a second position relative to the disk medium to compensate for the determined position error of the magnetic head, wherein the first and second magnetic servo information are included in a single servo spiral.

10. The disk drive of claim 9, wherein reading the first magnetic servo information comprises generating a first signal that includes a first portion associated with magnetic transitions included in the first magnetic servo information and a second portion associated with a media granularity signature of a circumferential path of the first read sensor.

11. The disk drive of claim 9, wherein the first and second magnetic servo information are read by the first and second read sensors during writing of another servo spiral by the write head.

12. The disk drive of claim 9, wherein the first and second magnetic servo information are read by the first and second read sensors during writing of a servo wedge for a track of the disk medium by the write head.

13. The disk drive of claim 10, wherein reading the second magnetic servo information comprises generating a second signal that includes a third portion associated with magnetic transitions included in the second magnetic servo information and a fourth portion associated with a media granularity signature of a circumferential path of the second read sensor.

* * * * *